(No Model.)

W. LAHEY.
JOURNAL BEARING.

No. 351,606. Patented Oct. 26, 1886.

Witnesses:
John A. Rennie
A. D. Harrison

Inventor
Wm. Lahey
Per: Wright, Brown & Quinby
his Attys.

N. PETERS, Photo-Lithographer, Washington, D. C.

UNITED STATES PATENT OFFICE.

WILLIAM LAHEY, OF STONEHAM, ASSIGNOR OF ONE-HALF TO THOMAS LAHEY, OF HAVERHILL, MASSACHUSETTS.

JOURNAL-BEARING.

SPECIFICATION forming part of Letters Patent No. 351,606, dated October 26, 1886.

Application filed May 22, 1886. Serial No. 202,968. (No model.)

*To all whom it may concern:*

Be it known that I, WILLIAM LAHEY, of Stoneham, in the county of Middlesex and State of Massachusetts, have invented certain new and useful Improvements in Journal-Bearings for Shafts of Sole-Edge-Trimming Machines, of which the following is a specification.

This invention has for its object to provide certain improvements in journal-bearings for shafts of machines for trimming or burnishing the edges of boot and shoe soles; and it consists in the combination, with a supporting-frame and a shaft supported thereby and carrying a trimming or burnishing tool, of certain devices, hereinafter described, whereby wear of said shaft and its bearings can be readily compensated for and the shaft and tool caused to run steadily without the necessity of prolonged stoppage of the machine or of the services of a skilled mechanic.

Figure 5:
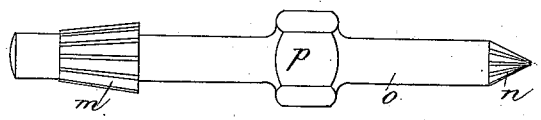
Figure 4:
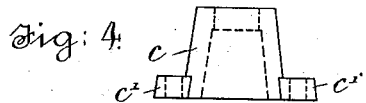
Figure 2:
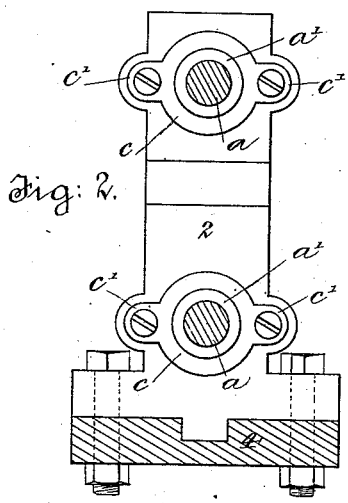
Figure 3:
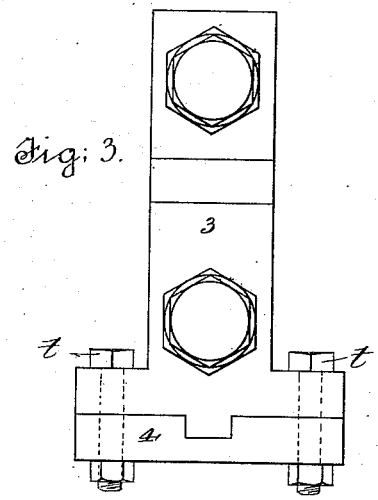
Figure 1:
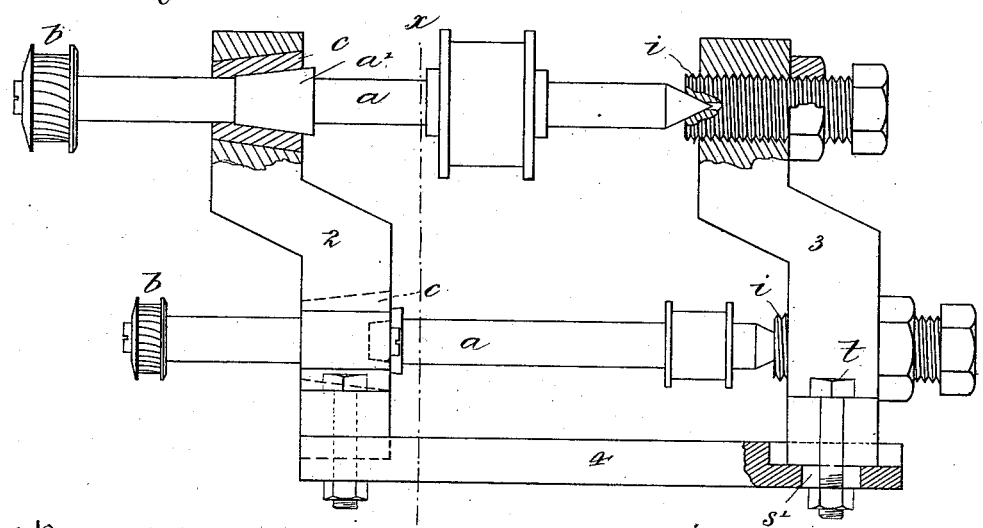

Of the accompanying drawings, forming a part of this specification, Figure 1 represents a side elevation and partial section of an edge-trimming machine embodying my invention. Fig. 2 represents a section on line $x$ $x$, Fig. 1, looking toward the left. Fig. 3 represents an elevation of the right-hand end of the machine shown in Fig. 1. Fig. 4 represents a top view of one of the bearing-boxes detached from the frame of the machine. Fig. 5 represents the tool used in forming the bearings.

The same letters of reference indicate the same parts in all the figures.

The head or frame supporting the tool-carrying shaft, hereinafter described, is mounted, preferably, on a suitable stand, and has two arms or vertical portions, 2 3, through which pass one or more (preferably two) shafts, $a$ $a$, said shafts being provided with cutters $b$ $b$, formed in this case the one to trim the edge of the fore part and the other the edge of the shank of a boot or shoe sole. The arm 2 of the head has enlarged sockets, which receive removable bearing-blocks $c$ $c$, of soft metal, which blocks have ears $c'$ $c'$, which are attached to the arm 2 by screws passing through said ears. The blocks $c$ $c$ are provided with tapering sockets or bearings, which receive correspondingly-tapered enlargements $a'$ on the shaft $a$. The arm 3 has two internally screw-threaded sockets, which receive screws $i$ $i$, of soft metal. The inner ends of said screws have conical sockets, which receive the conical ends of the shafts $a$ $a$.

It will be seen that the shafts $a$ $a$ are supported by the blocks $c$ $c$ and screws $i$ $i$, and that by setting up the screws from time to time all wear of the bearings may be compensated for, and any wabbling or lost motion of the shafts, either endwise or laterally, may be prevented, and all by the simple act of turning up the screws $i$ $i$, which can be performed by any operative usually employed in a shoe-factory. The bearings may therefore be kept in good condition, so as to cause the cutters to run perfectly true without need of the services of a machinist.

It is very important that rotary sole-edge-trimming cutters should run as steadily as possible without vibration or lateral motion, and this is secured in the most simple and practicable manner by the devices above described.

The bearings $c$ $c$, when worn so far as to be useless, may be removed or replaced by new ones.

It is obvious that one shaft may be employed instead of two.

When the bearings in the screws $i$ and blocks $c$ become ill-shaped by wear, they may be re-formed by the milling-tools $m$ $n$, (shown in Fig. 5,) one of said tools being formed to correspond with the enlargements $a'$ on the shaft $a$ and the other to correspond with the conical ends of said shafts.

The tools are affixed to a rod or shaft, $o$, having a central octagonal enlargement, $p$. When the tools are to be used, the rod $o$ is put in the place of one of the shafts and turned by means of a wrench applied to the enlargement $p$, the screw $i$ being turned up from time to time until the bearings are properly formed by the tools $m$ $n$.

The arms 2 3 are bolted to a base, 4, and the arm 3 is preferably adjustable on said base, so that it may be moved toward or from the arm 2, an adjustment of the bearings for the conical ends of the shafts, in addition to that provided by the screws $i$ $i$, being thus permitted.

The base 4 has slots $s'$, through which pass the bolts *t t*, which attach the arm 3 to the base, said slots and screws enabling the arm 3 to be adjusted.

The described improvements are applicable to burnishing as well as trimming machines.

I claim—

1. The combination of the arms or supports 2 3, a removable bearing, *c*, in the arm 2, having a conical bore, a socketed screw, *i*, in the arm 3, and the shaft *a*, having a tapering enlargement, *a'*, fitting in the bearing *c*, and a tapered end fitting the socket in the screw *i*, the tapering enlargement being arranged with its base or larger end toward said screw, whereby when said screw is properly turned it presses said enlargement into its bearing, as set forth.

2. The combination of the head composed of the base 4 and the arms 2 3, the latter being adjustable on said base, the removable bearings *c* in the arm 2, the socketed screws *i* in the arm 3, and the shafts *a*, having tapered enlargements and tapered ends, fitting, respectively, the bearings *c* and socketed screws *i*, as set forth.

In testimony whereof I have signed my name to this specification, in the presence of two subscribing witnesses, this 18th day of May, 1886.

WILLIAM LAHEY.

Witnesses:
A. H. BROWN,
C. F. BROWN.